J. L. HALL.
Lock.
No. 4,018. Reissued June 7, 1870.
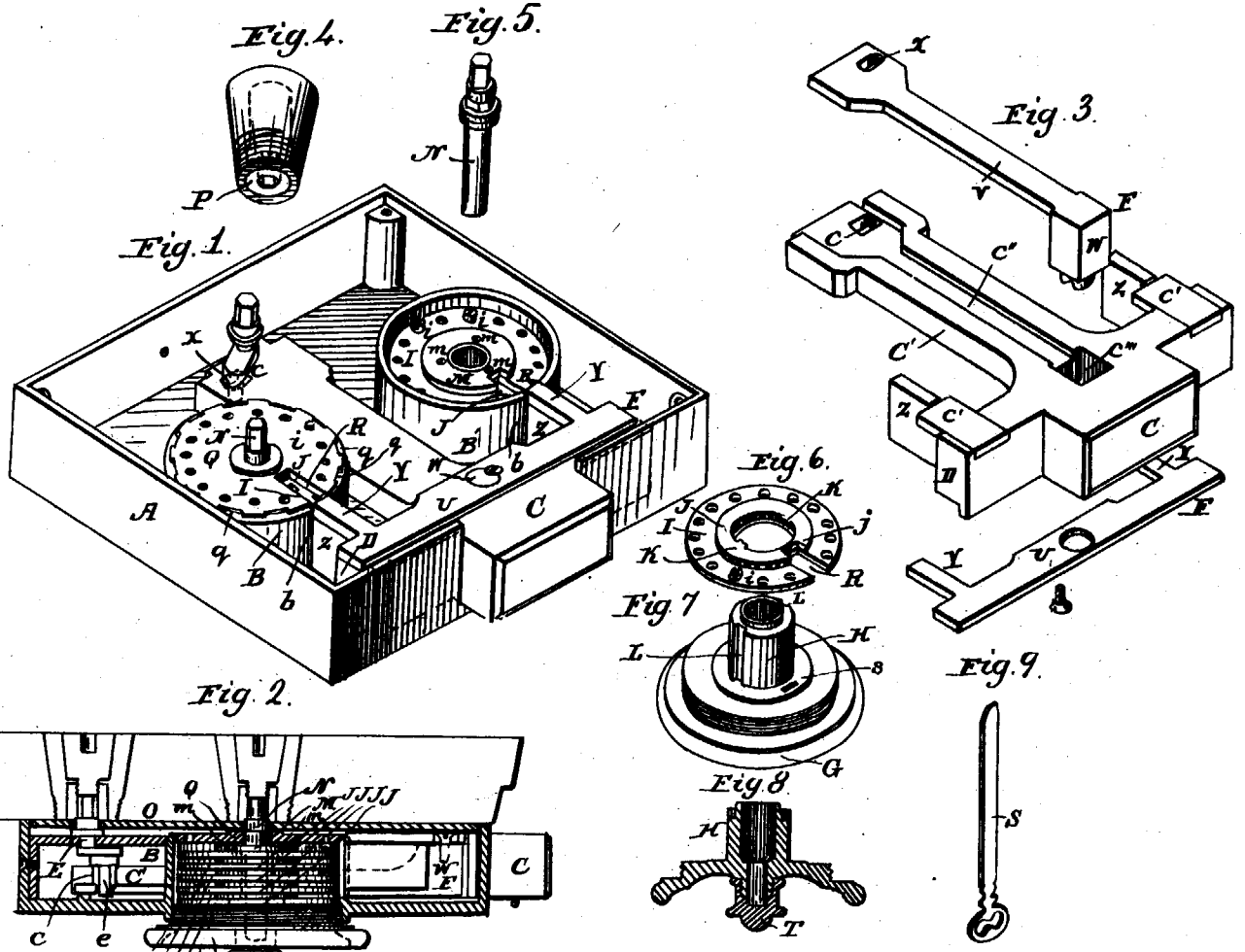
Witnesses:
Chas. A. Gratz
A. H. Reid
Inventor:
Joseph L. Hall
per Wright Brown & Quinby Atty.
N. PETERS. Photo-Lithographer. Washington, D. C.

United States Patent Office.

HALL'S SAFE AND LOCK COMPANY, OF CINCINNATI, OHIO, ASSIGNEE OF JOSEPH L. HALL.

*Letters Patent No.* 38,384, *dated May* 5, 1863; *reissue No.* 4,018, *dated June* 7, 1870.

IMPROVEMENT IN LOCKS.

The Schedule referred to in these Letters Patent and making part of the same.

*To all whom it may concern:*

Be it known that I, JOSEPH L. HALL, of Cincinnati, in the county of Hamilton and State of Ohio, did invent certain new and useful Improvements in Locks; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use my invention, I will proceed to describe it.

This improvement relates to that class of bank or vault-locks in which a series of gated rings, called "tumblers," opposes the retraction of the bolt, except when they are arranged according to a secret formula; and My invention consists in—

First, constructing a lock with two or more independent nests of tumblers, so arranged that the bolt cannot be moved until all the tumblers of all the nests are properly adjusted.

Second, provisions to facilitate a rearrangement of the tumblers without taking off the lock.

Third, provisions for increasing the strength and durability, and diminishing the friction of rotating tumblers.

Figure 1 is a perspective view of a lock embodying my improvements, the bolt being thrown forward, and the cover removed;

Figure 2 is a section of the same parallel to the main bolt;

Figure 3 is a reverse view of my main bolt and sliding check-piece, detached;

Figures 4, 5, 6, and 7, are, respectively, detached views of a key-hub or thimble, stem, tumbler, and tumbler-hub;

Figure 8, an axial section of a tumbler-hub; and

Figure 9 represents a trier.

B B are two exactly similar cylindrical chambers, open at both ends, and cast in one piece with the case A. Each chamber is gated, to receive stumps upon the main bolt, which is constructed in the manner following:

C is the head, and C′ the shank of the bolt proper.

D is a cross-head, armed with two stumps, Z, adapted to enter the gates *b* of the chambers B B.

*c* is a slot in the shank C′, for the wrist or bit *e* of the crank E.

*c′* are stops projecting from the main bolt, to limit its retraction.

The main bolt is recessed, *c″ c‴*, to receive a peculiar dog or sliding check-piece, of the following construction:

U is the cross-piece, and V the shank of my check-piece F, the said shank occupying the recess, *c″*, in the rear of the bolt-shank, and connected to the former by a web, W, which traverses the mortise *c‴*, in which it has a slight play longitudinal of the bolt.

X is a slot in the dog-shank, made narrower than that in the bolt, in order that the crank E may operate the dog F before it can move the bolt at all.

Y are stumps or tongues, which extend backward from the sliding cross-plate U, and enter without touching the bottom of one of the depressions in the periphery of the fast tumbler, to be presently described.

Each chamber B B′ has secured within it a hub, G, having a cylindrical projection, H, to receive a series of alternate tumblers, I, and washers J, which fit snugly around said projection H, the tumblers I revolving freely around it, while the washers J are held from rotation by tongues K, which occupy grooves L in the projections H.

The entire series of washers and loose tumblers I J is confined by an annular cap, M, secured to the hub.

The above-described arrangement, besides having greater strength and stability than the customary open-centered rings, and less friction, enables the entire "nest" to be withdrawn, and held in any position that may be desired, for inspection or change of combination, without danger of dropping any of the pieces, and without taking off the lock.

N is a stem, cylindrical at those portions which are intended to revolve within the hub G and the covering-plate O of the lock, and polygonal at its outer end, to fit the thimble or key-hub P in the door. The stem N is also polygonal where it occupies a corresponding eye in the collar Q.

The collar Q constitutes my fast tumbler, and differs from the loose tumblers I in always rotating with the stem.

Both fast tumblers Q and the loose tumblers I are perforated, to receive one or more pins, *i*, by means of which the rotation or partial rotation of the stem and fast tumblers N Q is communicated in alternately opposite directions to the successive tumblers of the series, in manner familiar in this class of locks.

Each of the tumblers I Q and washers J has a gating, R. The fast tumbler Q has also around its periphery a series of shallow notches, *q*, into which, when the bolt is clandestinely withdrawn, the stumps of the check-pieces enter.

The notches *q* are cut slightly deeper than the extreme penetration of the dog-stumps Y, so as to prevent any sound of contact between the latter and the fast tumbler, which would guide the ear in determining whether the stump had entered the gate proper, or one of the blind notches merely.

S is a trier, which, being inserted through the aperture *s* in the hub, is used to discover the gating position of the tumblers.

The gatings *j* of the washers act to guide and steady the tip of the trier as it is pushed in from tumbler to tumbler.

T is a plug or cap, whose removal enables the partial sliding out of the stem N, so as to render it temporarily clear of the key-hub. The stem N, then, being turned forty-five degrees, or any multiple thereof, and reinserted, changes the entire combination, which may then be ascertained by the insertion of the trier S, and manipulation of the tumblers.

A key and index-plate may be employed similar to those described in my patent of 25th September, 1860.

*Operation.*

The first action of the key, when applied to retract the bolt, is to slide back the dog or check-piece F, the parts of which are so proportioned that it comes to its bearings before the stumps reach the bottoms of the notches in the fast tumbler Q, so that any sound accompanying this movement is merely that of the check-piece reaching its bearings in the main bolt. It is, therefore, impossible to detect, by any sound, whether the check-piece has entered the gate proper, or one of the blind notches, and this movement, being completed before the bolt itself is started back, effectually locks the tumblers against any rotation whatever, so that no bolt pressure can be brought to bear in connection with an experimental rotation of the tumblers.

This device is believed to render the lock unpickable; but, for the larger class of vault-locks, I provide a great additional complication in the feature of duplicated nests of tumblers, the chance of gating both sets at the same time being inconceivably remote.

In practice, the cashier may usually merely derange one series of tumblers after closing the vault or safe, for a burglar could not know that either set was gated, and would inevitably derange both.

The facilities for partially withdrawing and shifting the central stem of either nest of tumblers, or for withdrawing and handling an entire nest, enable a ready change or inspection of combination without taking off the lock.

I do not desire to confine myself to the precise arrangement here selected for illustration, so long as I attain the same results by means substantially equivalent; for example, the sliding check-piece has been found to serve a good purpose when arranged wholly on the front side of the bolt, and in connection with a single set of tumblers; and it is believed that my sliding check-piece can be advantageously applied to various forms of oscillating and sliding tumblers.

The number of loose tumblers may vary from one to five, or even more, according to the style and requirements of the particular lock; and the number of nests, as well as the number of tumblers in each separate nest, may be increased to any desired extent.

Having thus described my invention,

What I claim is—

1. The combination of two or more independent nests of disk-tumblers, each nest containing two or more tumblers, with a bolt having a corresponding number of stumps arranged to operate in connection with said nests of tumblers, all constructed and arranged substantially as described.

2. The provision of the sliding check-piece or dog F, operated in advance of the main bolt by the same key or other device which moves the latter, in combination with one or more sets of tumblers, substantially as and for the purpose set forth.

3. In the described combination with the fast tumblers Q, the provision of the sliding check-piece or dog F, operated in advance of the main bolt by the same bit, key, or other instrument which moves the said bolt, the whole being combined and operating as and for the purposes substantially as set forth.

4. The arrangement of hollow withdrawable hub G, containing the operating-stem N, and supporting the series of alternate loose tumblers I and fast washers J, the whole being confined to said hub by the annular cap M, in the manner represented.

5. The combination of cap T, shiftable stem N, and fast tumblers Q, to facilitate numerous and ready changes of combination, as explained.

6. The fixed washers J, gated. *j*, in line with the aperture, *s*, in the hub G, to afford a fixed guide for the trier, as described.

JOSEPH L. HALL,
*Pres't and Treasurer of Hall's Safe and Lock Co.*

Witnesses:
PETER NEFF, Jr.,
JOHN B. MARLING.